F. L. CAMPBELL.
ARTIFICIAL BAIT.
APPLICATION FILED SEPT. 20, 1916.

1,267,627.

Patented May 28, 1918.

Witnesses

Inventor
F. L. Campbell
By Victor J. Evans
Attorney

UNITED STATES PATENT OFFICE.

FRANKLIN L. CAMPBELL, OF DELAWARE, OHIO.

ARTIFICIAL BAIT.

1,267,627.  Specification of Letters Patent.  Patented May 28, 1918.

Application filed September 20, 1916. Serial No. 121,225.

*To all whom it may concern:*

Be it known that I, FRANKLIN L. CAMPBELL, a citizen of the United States, residing at Delaware, in the county of Delaware and State of Ohio, have invented new and useful Improvements in Artificial Bait, of which the following is a specification.

The invention relates to a bait hook, and more particularly to the class of artificial baits for fishing hooks.

The primary object of the invention is the provision of a bait of this character wherein the body thereof is freely flexible and is connected at one point thereof to the hook so that the said body will wiggle when immerged in water to resemble a species of water bug having life, such as a hellgrammite.

Another object of the invention is the provision of a bait of this character wherein the same will have motion to simulate a hellgrammite when cast into the water, the bait being novel in form so that it can be made by stamping out the same with the use of a die.

A further object of the invention is the provision of a bait of this character which is designed particularly for light casting for bass and other game fish.

A still further object of the invention is the provision of a bait of this character which is extremely simple in construction, thoroughly reliable and efficient in its purpose, strong, durable, readily and easily made with despatch and inexpensive of manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claim.

In the accompanying drawings.

Similar reference characters indicate corresponding parts throughout the several views of the drawing.

Figure 1:
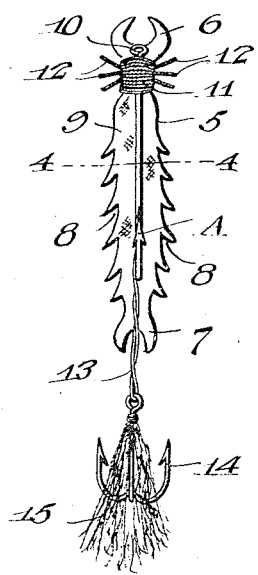
Figure 1 is an elevation of a fishing hook, showing the artificial bait constructed in accordance with the invention applied thereto.
Figure 2:
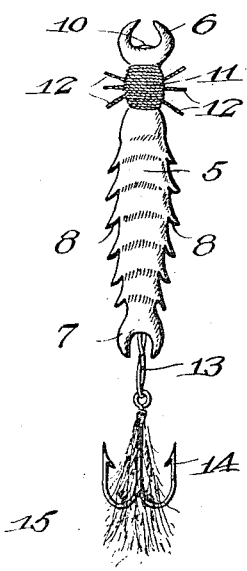
Fig. 2 is a similar view looking toward the opposite side of the same.
Figure 3:
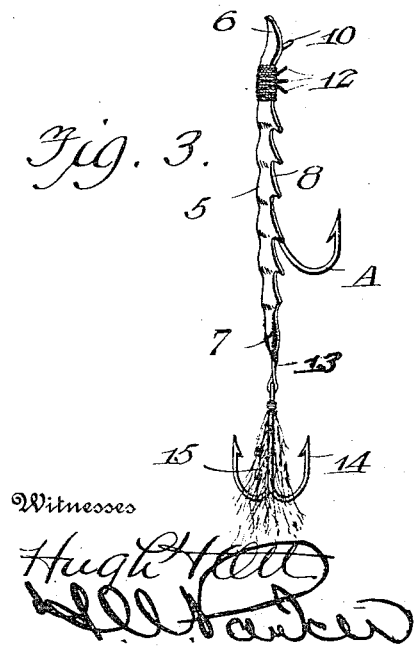
Fig. 3 is an edge elevation.
Figure 4:
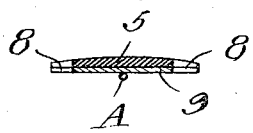
Fig. 4 is a sectional view on the line 4—4 of Fig. 1.

Referring to the drawings in detail, A designates a fishing hook adapted for use in light casting and upon which is mounted the artificial bait hereinafter fully described. The artificial bait comprises a body 5 preferably made from flexible rubber cut into elongated contour, with the substantially crescent shaped head 6 and tail 7 respectively, while the side edges of the body 5 are corrugated, as at 8, so that the body resembles a hellgrammite. The inner face of the said body 5 is covered with a fabric 9 which reinforces the said body without destroying the free flexibility thereof.

The body 5, near the head thereof, is fastened to the hook A near the eye end 10 of the same through the medium of heavy linen thread 11, waxed and slightly shellacked, the thread being tied and cut in a manner to form a plurality of legs 12, as shown.

The thread 11 also fixes to the shank of the hook A a depending hanger 13 preferably made from catgut and to which is loosely connected a triple hook 14 which carries a feather 15, as usual. The main or primary hook A with the triple hook 14 carried thereby, when cast into the water, immerges the body 15 simulating the hellgrammite and by reason of the flexibility of the body the same will wiggle in the water and serve as a bait for bass and other game fish.

It will be noted that the head and the major portion of the body are free from the main or primary hook A to assure free flexibility thereof. It is of course understood that the body 5 can be made from rubber vulcanized and having the shape hereinbefore set forth.

From the foregoing description, taken in connection with the accompanying drawing, the construction and mode of use of the herein described artificial bait will be readily apparent and, therefore, a more extended explanation has been omitted.

Having thus described my invention, I claim:

An artificial bait, comprising an elongated body made from flexible material and adapted to be connected at one point to the hook, the said body being formed with a substantially crescent-shaped head and tail and also corrugated side edges, the means of connection between the body and hook having terminal projections stiffened to project beyond the body plane to indicate legs, a hanger connected at the point of connection of the body and hook, and a triple hook loosely connected to the hanger.

In testimony whereof I affix my signature in presence of two witnesses.

FRANKLIN L. CAMPBELL.